United States Patent
Kawano et al.

(10) Patent No.: US 9,969,498 B2
(45) Date of Patent: May 15, 2018

(54) WATER-INFLOW PREVENTION DEVICE OF AIRCRAFT, AIR PRESSURE REGULATING VALVE FOR AIRCRAFT, AND AIRCRAFT

(71) Applicant: MITSUBISHI AIRCRAFT CORPORATION, Aichi (JP)

(72) Inventors: Shingo Kawano, Tokyo (JP); Tomoka Mashio, Aichi (JP); Akitaka Urano, Aichi (JP); Shuichi Hagino, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days. days.

(21) Appl. No.: 15/357,131

(22) Filed: Nov. 21, 2016

(65) Prior Publication Data

US 2017/0066538 A1 Mar. 9, 2017

Related U.S. Application Data

(62) Division of application No. 13/938,545, filed on Jul. 10, 2013, now Pat. No. 9,533,767.

(30) Foreign Application Priority Data

Jul. 12, 2012 (JP) .................................. 2012-156195

(51) Int. Cl.
| | |
|---|---|
| *B64C 1/00* | (2006.01) |
| *B64D 25/00* | (2006.01) |
| *B64D 13/02* | (2006.01) |
| *F16K 31/22* | (2006.01) |
| *F16K 31/30* | (2006.01) |
| *F16K 31/00* | (2006.01) |

(52) U.S. Cl.
CPC ............. *B64D 25/00* (2013.01); *B64D 13/02* (2013.01); *F16K 31/001* (2013.01); *F16K 31/22* (2013.01); *F16K 31/30* (2013.01); *B64C 2001/009* (2013.01); *Y10T 137/2036* (2015.04)

(58) Field of Classification Search
CPC .. B64D 25/00; B64D 13/02; B64D 2001/009; F16K 31/22; F16K 31/30; F16K 31/001; F16K 31/13
See application file for complete search history.

(56) References Cited

U.S. PATENT DOCUMENTS

| | | | | |
|---|---|---|---|---|
| 1,714,416 A | * | 5/1929 | Cannistra | ................ B64C 35/00 244/101 |
| 2,590,330 A | * | 3/1952 | Krueger | ................. B64D 13/02 454/73 |

(Continued)

FOREIGN PATENT DOCUMENTS

JP 3-67296 7/1991

*Primary Examiner* — Philip J Bonzell
(74) *Attorney, Agent, or Firm* — Wenderoth, Lind & Ponack, L.L.P.

(57) ABSTRACT

A water-inflow prevention device is provided by installing a closing lid 6 for blocking a duct 2 of an air pressure regulating valve 1, which regulates air pressure inside a cabin 101. A buoyant body 9 is attached to the disc-shaped closing lid 6 installed to the duct 2 so as to be rotatable around a rotation shaft 7. The buoyant body 9 receives a buoyant force from water when immersed in the water. Since the side of the closing lid 6 in which the buoyant body 9 is attached is thereby floated in the water, the closing lid 6 automatically rotates around the rotation shaft 7 so as to close a ventilation port 2a.

4 Claims, 10 Drawing Sheets

(56) References Cited

U.S. PATENT DOCUMENTS

| | | |
|---|---|---|
| 2,598,274 A | 5/1952 | Krueger |
| 3,728,955 A | 4/1973 | Ricaud |
| 4,463,774 A | 8/1984 | Gorges |
| 5,105,729 A | 4/1992 | Signoret et al. |
| 2013/0059518 A1 | 3/2013 | Biegemann |

* cited by examiner

WATER-INFLOW PREVENTION DEVICE OF AIRCRAFT, AIR PRESSURE REGULATING VALVE FOR AIRCRAFT, AND AIRCRAFT

BACKGROUND

Technical Field

The present invention relates to a device for preventing water inflow into an aircraft through an air pressure regulating valve in the occasion of emergency landing on water.

Related Art

An aircraft is equipped with an air pressure regulating valve, and the air pressure inside the aircraft during flight is regulated by controlling the opening of the valve. The air pressure regulating valve is usually installed in the lower portion of an aircraft body and the valve opening is maintained to be large when the altitude is low. There is therefore a possibility that sea water flows into the aircraft through the air pressure regulating valve when, for example, the aircraft lands on sea in the event of an emergency accident.

It is possible for a pilot to execute the operation of closing the air pressure regulating valve in the occasion of emergency landing on water. It is, however, supposed that the operation of closing the air pressure regulating valve would not be executed at once since the pilot has to execute other operations of higher priority than the operation of closing the valve in order to manage the emergency situation. In that case, the aircraft suffers a flood through the air pressure regulating valve having a large opening maintained, and it becomes difficult to secure the time for the passengers and crews to safely escape.

To cope with the above problem, it is proposed in Japanese Utility Model, publication No. 03-67296 to provide a buoyant force to an aircraft in the occasion of emergency landing on water by installing bag-like cushion seats and gas supply devices for supplying gas to the cushion seats. The cushion seats and gas supply devices are provided in the lower portion of the body and also on the underside of the wings of the aircraft.

SUMMARY

According to the proposal of Japanese Utility Model, publication No. 03-67296, since an aircraft is not immersed in water in the occasion of emergency landing on water, water does not flow into the aircraft through an air pressure regulating valve. It is, however, necessary to prepare for breakage of the cushion seats or other accident, because double or triple safety measures are demanded for an aircraft.

The present invention addresses the above problem with the object of providing a device for preventing water inflow into an aircraft through an air pressure regulating valve in the occasion of emergency landing on water without being operated by a pilot, an air pressure regulating valve equipped with the water-inflow prevention device, and an aircraft equipped with the air pressure regulating valve.

The present invention accomplished on the basis of the object relates to a device for preventing water inflow into an aircraft, which is equipped with an air pressure regulating valve for regulating air pressure inside a cabin, through the air pressure regulating valve when landing on water. This air pressure regulating valve is equipped with a vent passage for connecting the inside and outside of the aircraft and a valve body installed inside the vent passage. The water-inflow prevention device of the present invention has an obstacle against inflow of water without being operated by a pilot of the aircraft.

Incidentally, "prevention of water inflow" in the present invention does not necessarily means to completely prevent water inflow, but may include meaning reducing water inflow because it is conducive to securing the time for the passengers and crews to safely escape.

The obstacle constituting the water-inflow prevention device of the present invention gets a motion upon the occurrence of aircraft landing on water and is able to block the vent passage. Since moving upon the occurrence of aircraft landing on water, this obstacle is able to prevent water inflow without being operated by a pilot.

It is possible to construct the obstacle, which gets a motion upon the occurrence of aircraft landing on water, from a lid body that blocks the vent passage by being applied with a buoyant force. That is, the lid body is such one that becomes an obstacle for blocking the vent passage and preventing water inflow through the action of buoyant force, in the occasion of landing on water and being immersed in water The lid body gets the motion by utilizing a buoyant force, specifically so as to be rotated or raised.

According to this configuration, it is possible to get the motion of the lid body reliably by means of a buoyant force inevitably arising in the lid body by utilizing the state of being immersed in water without being operated by a pilot.

The lid body that is put in motion by being applied with a buoyant force can be materialized, besides by constructing the entire lid body from a material having gravity smaller than water, by constructing the lid body itself from a material having gravity greater than water and by attaching a buoyant body constructed from a material having gravity smaller than water to the lid body.

In the present invention, the vent passage can also be blocked by an obstacle that expands due to absorbing water or due to being supplied with gas into the inside thereof without being operated by a pilot.

The obstacle that expands due to absorbing water can be made of, for example, polyurethane. Also in this configuration, since the obstacle inevitably expands by being immersed in water, water inflow can be prevented without being operated by a pilot.

As the obstacle that expands due to being supplied with gas into the inside thereof, it is possible to presume, for example, the same mechanism as with an airbag used for automobiles. Also in this configuration, since the obstacle is certainly expanded upon receiving an impact of landing on water, water inflow can be prevented without being operated by a pilot.

The present invention enables to use the valve body of an air pressure regulating valve as an obstacle, which blocks the vent passage by getting a motion upon the occurrence of aircraft landing on water, which thereby brings about an advantage of being able to prevent water inflow without adding any other member than the air pressure regulating valve.

The obstacle in the present invention described above is one that gets a motion upon the occurrence of aircraft landing on water, while it is also possible to construct the obstacle of the present invention from a resistance body provided in advance on the upstream or downstream side of the valve body of an air pressure regulating valve in the direction of water inflow.

Thus, by providing the resistance body in advance, water inflow can be reliably prevented (reduced) without being operated by a pilot.

In the present invention, an air pressure regulating valve equipped with a water-inflow prevention device having the above mechanism is provided, and an aircraft equipped with the air pressure regulating valve is also provided.

According to the present invention, it is possible to prevent water inflow into an aircraft through an air pressure regulating valve in the occasion of emergency landing on water without being operated by a pilot.

BRIEF DESCRIPTION OF DRAWINGS

FIGS. 1A and 1B are cross-sectional views and FIGS. 1C and 1D are elevation views showing the vicinity of an air pressure regulating valve in version 1 of a first embodiment; FIG. 1A and FIG. 1C present the state during flight, and FIG. 1B and FIG. 1D present the state after landing on water;

FIGS. 4A and 4B are cross-sectional views and FIGS. 4C and 4D are elevation views showing the vicinity of an air pressure regulating valve in version 2 of a first embodiment; FIG. 4A and FIG. 4C present the state during flight, and FIG. 4B and FIG. 4D present the state after landing on water;

FIGS. 5A and 5B are cross-sectional views and FIGS. 5C and 5D are elevation views showing the vicinity of an air pressure regulating valve in a second embodiment; FIG. 5A and FIG. 5C present the state during flight, and FIG. 5B and FIG. 5D present the state after landing on water;

FIGS. 7A and 7B are cross-sectional views and FIGS. 7C and 7D are elevation views showing the vicinity of an air pressure regulating valve in a third embodiment; FIG. 7A and FIG. 7C present the state during flight, and FIG. 7B and FIG. 7D present the state after landing on water;

FIGS. 8A and 8C are cross-sectional views and FIGS. 8B and 8D are elevation views showing the vicinity of an air pressure regulating valve in a fourth embodiment; FIG. 8A and FIG. 8B present cup-shaped resistance bodies and FIG. 8C and FIG. 8D present a throttle-like resistance body;

FIGS. 9A and 9B are cross-sectional views and FIGS. 9C and 9D are elevation views showing the vicinity of an air pressure regulating valve in a fifth embodiment; FIG. 9A and FIG. 9C present the state during flight, and FIG. 9B and FIG. 9D present the state after landing on water.

DETAILED DESCRIPTION

Embodiments of a device for preventing water inflow into the cabin of an aircraft 100 through an air pressure regulating valve 1 in the occasion of emergency landing on water will be described below in detail on the basis of the attached drawings.

Figure 10:
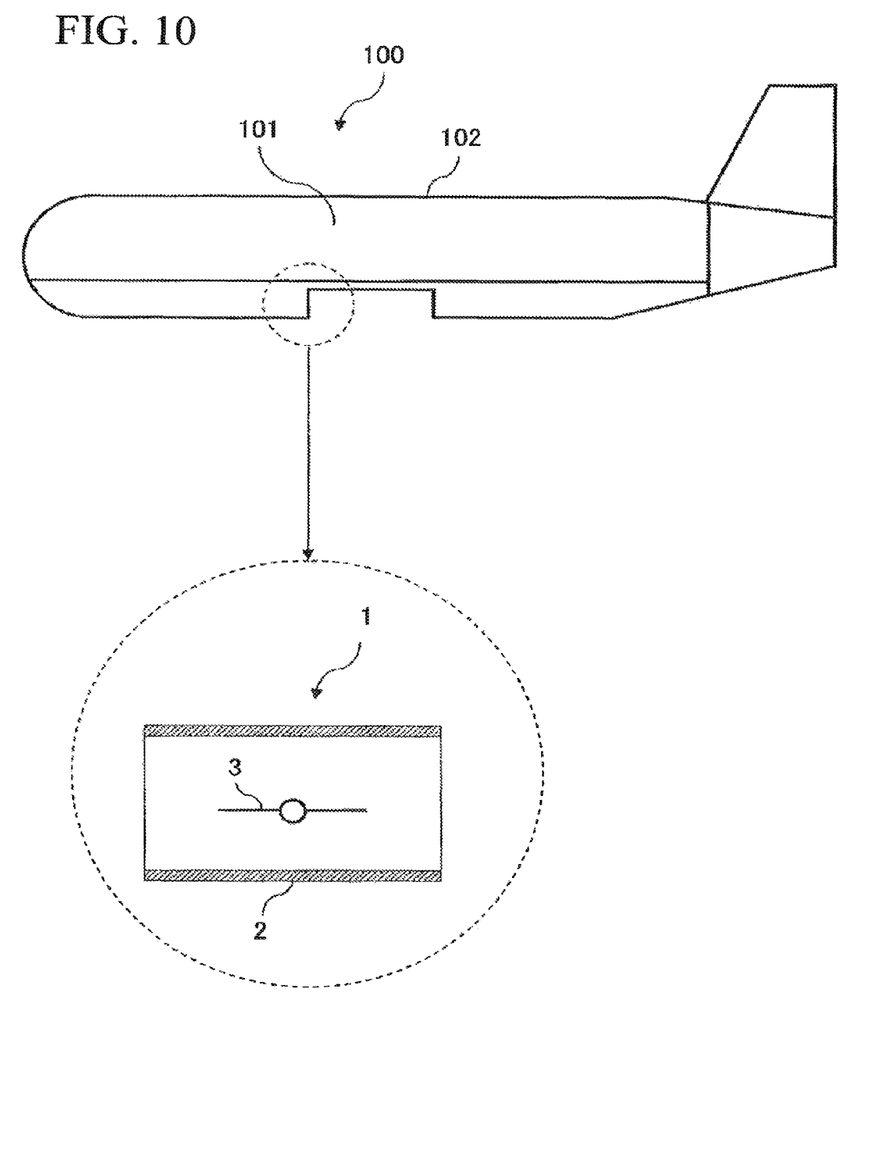
FIG. 10 is a side view showing an aircraft related to the present embodiments.

Incidentally, a brief explanation as to the aircraft 100 structure common to the respective embodiments will be given with reference to FIG. 10.

The aircraft 100 is equipped with a valve for regulating air pressure inside a cabin 101 (air pressure regulating valve 1) in the lower portion of a body 102. The air pressure regulating valve 1 comprises a cylindrical duct 2, which connects the cabin 101 and the outside of the aircraft 100, and a valve body 3 installed inside the duct 2. Here, as an example of the air pressure regulating valve 1, a butterfly valve that performs opening/closing by means of rotation of the valve body 3 around the valve shaft positioned in the center thereof is exemplified.

Although, in the occasion when the aircraft 100 has urgently landed on water, water inflow into the cabin 101 through the duct 2 is to be prevented by that a pilot actuates the valve body 3 to block the duct 2, there may be a case in which the operation of the pilot is delayed as described above. A device capable of preventing the water inflow into the cabin 101 through the duct 2 without relying on the operation of the pilot is provided in each of the embodiments described below.

First Embodiment

In a first embodiment, a blocking lid 6 for blocking the duct 2 without relying on the operation of the pilot in the occasion when the aircraft 100 has landed on water is installed as shown in FIGS. 1A to 1D. The first embodiment is particularly characterized in that the blocking lid 6 gets a motion so as to automatically block the duct 2 by being applied with a buoyant force when immersed in water. The first embodiment includes two versions. The first version (of the first embodiment) is such one in which the duct 2 is blocked by rotating the blocking lid 6. The second version (of the first embodiment) is such one in which the duct 2 is blocked by causing the blocking lid 6 to get an upward motion. The explanation thereof will be given below one by one. It is noted that the valve body 3 is omitted from the cross-sectional views of FIG. 1C and FIG. 1D. Also as to FIGS. 2C, 2D, 3C, 3D, 4C, 4D, 5C, 5D, 8B, and 8D, the valve body 3 is omitted as well.

First Version of the First Embodiment

The water-inflow prevention device according to the first version of the first embodiment comprises a disc-shaped blocking lid 6 attached to the duct 2 so as to be rotatable around a rotation shaft 7, and a buoyant body 9 attached to the blocking lid 6.

One end of the blocking lid 6 in a diameter direction thereof is held by the rotation shaft 7 located at an end portion of a ventilation port 2a, which is the top end of the duct 2, and the blocking lid 6 is thereby allowed to be freely rotatable around the rotation shaft 7. As long as being freely rotatable around the rotation shaft 7, the structure of holding the blocking lid 6 to the rotation shaft 7 is not questioned. The blocking lid 6 may be formed of a similar material as that constituting the aircraft 100 or of a different material. For example, a metal material, fiber-reinforced plastic, resin material, or the like is available as the material.

The buoyant body 9 is disposed at the position symmetrical to the rotation shaft 7 with respect to the barycenter of the blocking lid 6, which is taken as the center, i.e., at the other side end in the diameter direction thereof. The buoyant body 9 is formed of a material having gravity smaller than water such as, for example, a resin material. The buoyant body 9 may be configured to be a hollow substance in which gas is filled in the inside thereof.

Figure 1A:
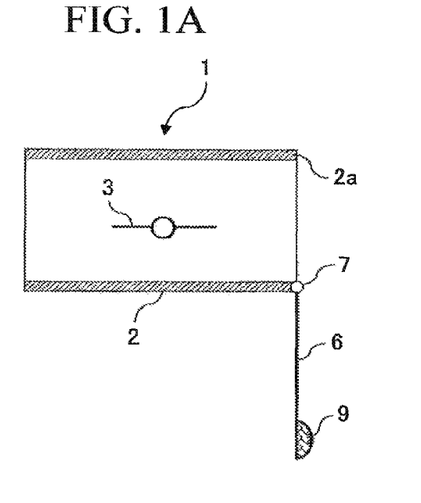
Figure 1B:
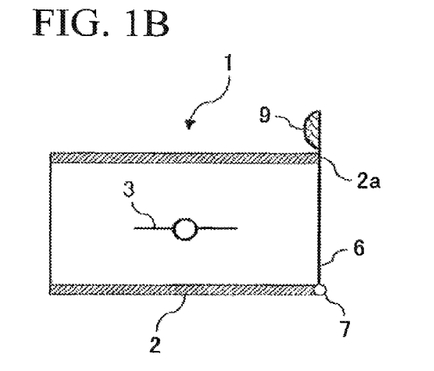
Figure 1C:
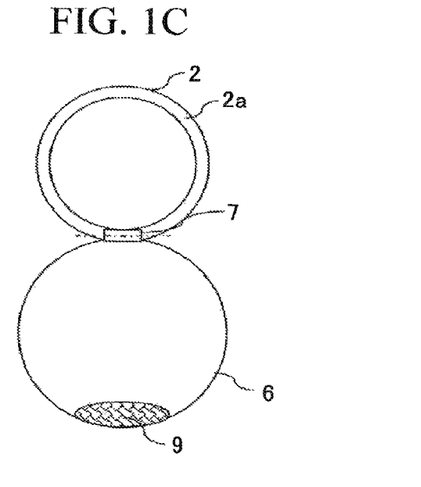

As shown in FIG. 1A and FIG. 1C, during flight of the aircraft 100, the water-inflow prevention device is in a state in which the ventilation port 2a of the duct 2 is opened since the blocking lid 6 has fallen from the rotation shaft 7 due to gravity. The air pressure inside the cabin 101 is therefore regulated in a manner that the opening degree of the valve body 3 in the duct 2 is regulated depending on the flight altitude of the aircraft 100.

Figure 1D:
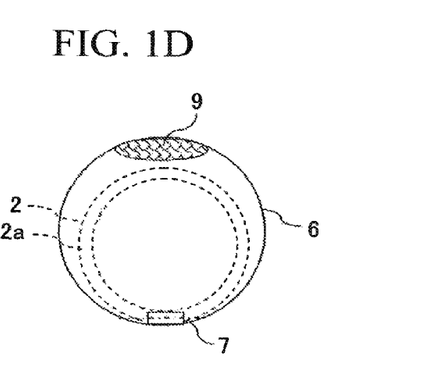

On the other hand, when the aircraft 100 lands on water and the blocking lid 6 is immersed in water, the buoyant body 9 receives a buoyant force from water. Then, the blocking lid 6 automatically rotates around the rotation shaft 7 so as to close the ventilation port 2a as shown in FIG. 1B and FIG. 1D due to that the side having the buoyant body 9 installed thereto floats up in the water. Since the ventilation port 2a is closed by the blocking lid 6 like this, it becomes possible to prevent water inflow from the outside of the aircraft. In addition thereto, since the blocking lid 6 automatically rotates upon being immersed in water, the ventilation port 2a can be closed without being operated by a pilot. It is therefore possible to prevent water inflow into the cabin 101 even though the operation of closing the valve body 3 by the pilot is postponed; consequently, safe escape of the passengers and crews can be secured. It is noted that "prevention of water inflow" so called here does not only mean to completely stop the water inflow, but also includes reducing the amount of flowing-in water even when it happens.

Modification Example 1: Water-Soluble Fixing Material

In the embodiment described above, since the blocking lid 6 is configured to be freely rotatable with respect to the rotation shaft 7, there is a fear that the blocking lid 6 may be put in unexpected motion due to undergoing airflow during flight and may close the ventilation port 2a. In order to prevent this possible happening, the free rotational motion of the blocking lid 6 in this embodiment can be restricted by use of a water-soluble fixing material 11 as shown in FIGS. 2A to 2D. Since having the same configurations as the above embodiment except restricting the motion of the blocking lid 6 by use of the water-soluble fixing material 11, the same reference characters as in FIGS. 1A to 1D are used in FIGS. 2A to 2D, and the explanation is omitted. Modification example 2 and following embodiments are dealt in a like manner.

Figure 2A:
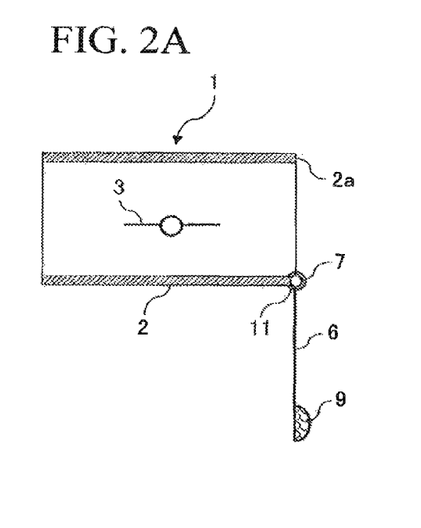
FIGS. 2A to 2D are drawings showing a modification example of the version 1 of the first embodiment.
Figure 2B:
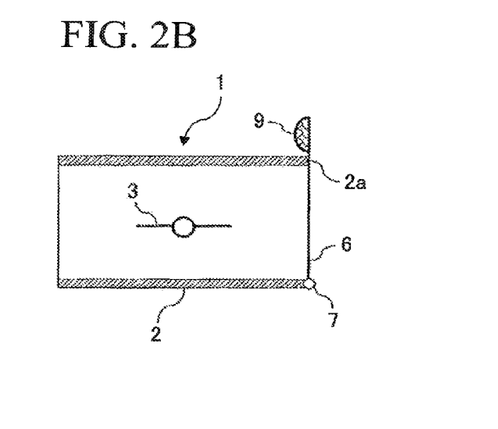
Figure 2C:
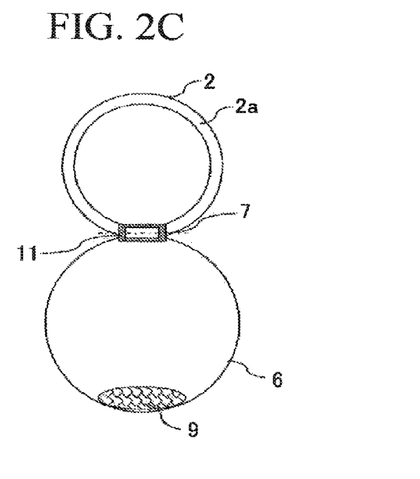

Substances which exist as a solid in the air and are softened or dissolved when wetted can be used as the water-soluble fixing material 11. Examples of the such substances include a water-soluble acrylic polymer and water-soluble polysaccharides, which are used for an adhesive. Incidentally, the manner of restricting the motion of the blocking lid 6 by use of the water-soluble fixing material 11 is arbitrarily chosen. In the case in which the blocking lid 6 rotates with respect to the rotation shaft 7, the water-soluble fixing material 11 is applied so as to halt the rotation, while in the case in which the blocking lid 6 is fixed to the rotation shaft 7, the water-soluble fixing material 11 is applied so as to halt the rotation of the rotation shaft 7. The blocking lid 6 can be fixed at the position of being slung from the rotation shaft 7 as shown in FIG. 2A and FIG. 2C, for example, but may also be fixed at a position of being rotated counter-clockwise from the position shown in FIG. 2A and FIG. 2C.

Figure 2D:
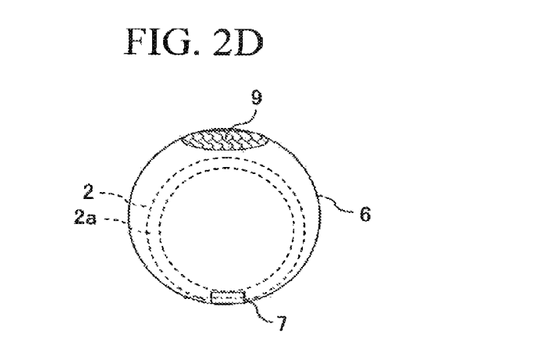

By configuring as described above, the ventilation port 2a is not closed by the blocking lid 6 during flight of the aircraft 100. However, the water-soluble fixing material 11 begins to be dissolved when immersed in water after the aircraft 100 has landed on water. Then, since the restriction due to the water-soluble fixing material 11 is removed and the blocking lid 6 is allowed to be freely rotated, the blocking lid 6 closes the ventilation port 2a as shown in FIG. 2B and FIG. 2D due to a buoyant force applied to the buoyant body 9 and water inflow into the cabin 101 is thereby prevented.

Modification Example 2: Sealing Structure

In this embodiment, it is more desirable to hermetically close the ventilation port 2a with the blocking lid 6 from the point of preventing water inflow into the cabin 101.

Figure 3A:
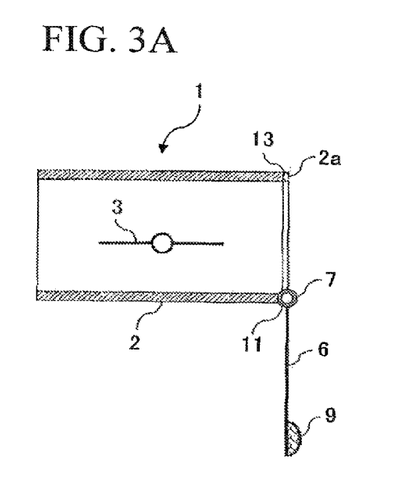
FIGS. 3A to 3D are drawings showing another modification example of the version 1 of the first embodiment.
Figure 3B:
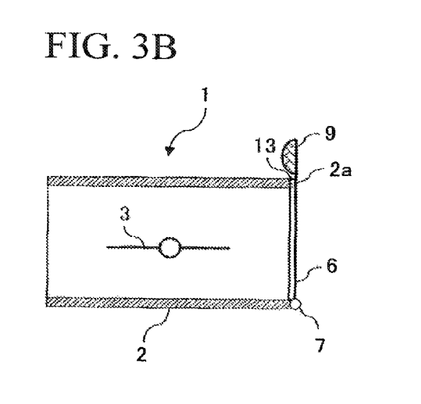
Figure 3C:
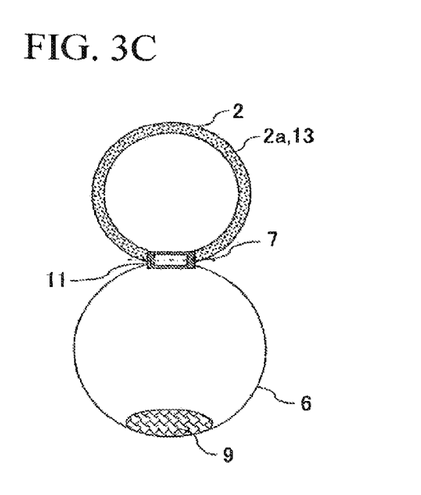
Figure 3D:
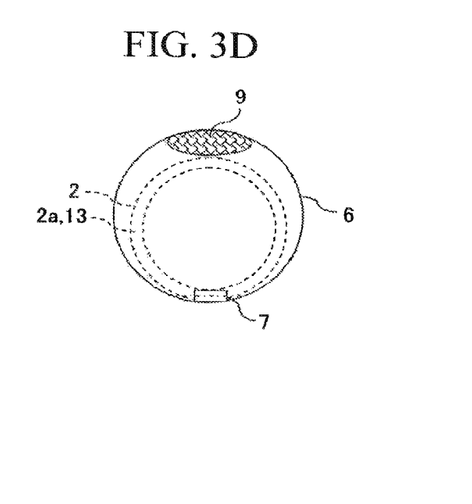

For this reason, a ring-shaped sealing material 13 may be stuck on the edge of the ventilation port 2a as shown in FIGS. 3A to 3D. Rubber or resin is available as the sealing material 13. Since the blocking lid 6 can be brought into close contact with the duct 2 through the sealing material 13 when the aircraft 100 has landed on water and the ventilation port 2a is closed by the blocking lid 6 as shown in FIG. 3B and FIG. 3D, water inflow into the cabin 101 can be more reliably prevented.

It is noted that, although the sealing material 13 is provided on the side of the duct 2 in this case, the sealing material 13 may also be provided on the blocking lid 6.

Second Version of the First Embodiment

Next, the second version of the first embodiment in which the duct 2 is blocked by causing the blocking lid 6 to get an upward motion will be described with reference to FIGS. 4A to 4D.

The water-inflow prevention device in this embodiment is identical to the first version described above in the point that the blocking lid 6 provided with the buoyant body 9 closes the ventilation port 2a of the duct 2. However, the water-inflow prevention device according to the second version is provided with a guide rail 14 for the reason that the blocking lid 6 is allowed to get a required upward motion.

The U-shaped guide rail 14 is constituted of a pair of linear guide portions 14a, 14b, which are arranged at a predetermined spacing away, and an arc-shaped holding portion 14c, which couples the linear guide portions 14a, 14b at each end thereof. The spacing between the linear guide portions 14a, 14b is set to be approximately equal to the diameter of the duct 2, and the radius of the holding portion 14c is set to be approximately equal to the radius of the duct 2.

In the inner periphery of each of the linear guide portions 14a, 14b and holding portion 14c, there is formed a guide groove 14d along the longitudinal direction of the guide rail 14. The peripheral edge of the blocking lid 6 is inserted into the guide groove 14d.

In addition, an arc-shaped sealing material 15 is embedded in the guide groove 14d that is formed in the holding portion 14c. The guide groove 14d of the holding portion 14c is therefore formed deeply by the thickness of the sealing material 15 as compared with the guide groove 14d of the linear guide portions 14a, 14b. That is, the linear guide portions 14a, 14b and the holding portion 14c are formed so that the blocking lid 6 is inserted into an equal depth in the guide groove 14d in the state in which the sealing material 15 is embedded. In a lower portion of each of the linear guide portions 14a, 14b, a stopper 8 for holding the blocking lid 6 is provided.

The guide rail 14 is structured so that the holding portion 14c is fixed to the ventilation port 2a of the duct 2 so as to match the upper arc portion of the duct 2, and the linear guide portions 14a, 14b are arranged along the vertical direction.

The blocking lid 6 has the peripheral edge inserted into the guide groove 14d of the guide rail 14, and is allowed to freely move in the vertical direction along the guide rail 14, particularly the linear guide portions 14a, 14b thereof.

Figure 4A:
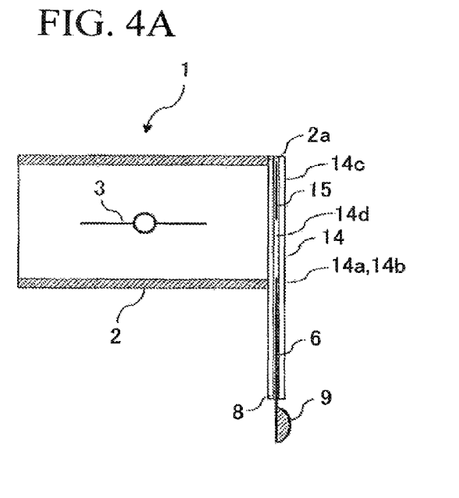
Figure 4B:
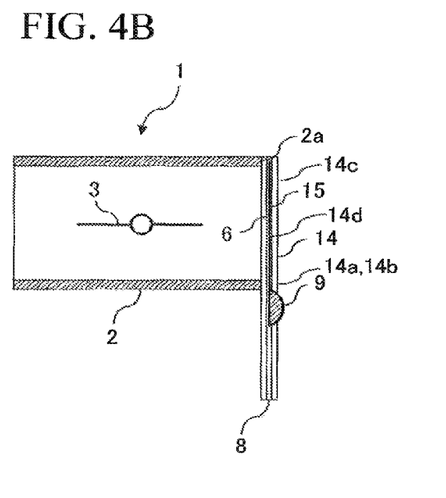
Figure 4C:
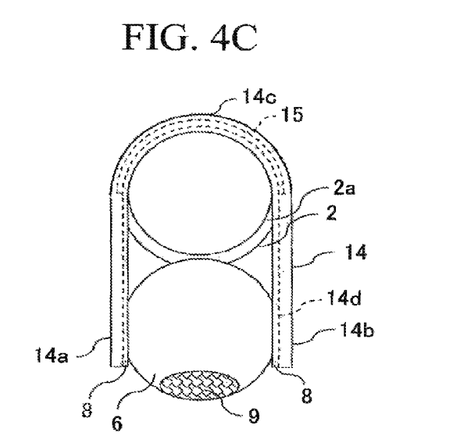

The blocking lid 6 is prevented from coming off downward due to being held with the stoppers 8 when positioned at the lowest end as shown in FIG. 4A and FIG. 4C. The position of the stoppers 8 is chosen so that the blocking lid 6 does not cover the ventilation port 2a when positioned at the lowest end.

During flight of the aircraft 100, the ventilation port 2a of the duct 2 is open since the blocking lid 6 is positioned at the lowest end to be held with the stoppers 8. The air pressure inside the cabin 101 is therefore regulated in a manner that the opening degree of the valve body 3 in the duct 2 is regulated depending on the flight altitude of the aircraft 100.

Figure 4D:
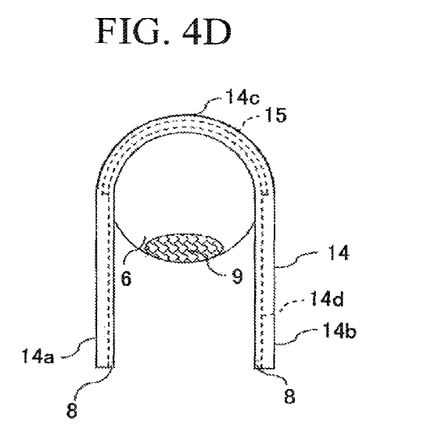

On the other hand, when the aircraft 100 lands on water and the blocking lid 6 is immersed in water, the buoyant body 9 receives a buoyant force from water. Then, the blocking lid 6 is caused to get an upward motion toward the holding portion 14c as being guided by the linear guide portions 14a, 14b as shown in FIG. 4B and FIG. 4D due to that the side having the buoyant body 9 installed thereto floats up in the water. The blocking lid 6 closes the ventilation port 2a when moved up to the holding portion 14c. Since the ventilation port 2a is closed by the blocking lid 6 like this, it becomes possible to prevent water inflow from the outside of the aircraft 100. In addition thereto, since the blocking lid 6 automatically moves toward the holding portion 14c upon being immersed in water, the ventilation port 2a can be closed without being operated by a pilot. It is therefore possible to prevent water inflow into the cabin 101 even though the operation of closing the valve body 3 by the pilot is postponed as with the first version of the first embodiment; consequently, safe escape of the passengers and crews can be secured. Moreover, since the sealing material 15 provided in the holding portion 14c and the peripheral edge of the blocking lid 6 come into close contact with each other when the blocking lid 6 has reached the holding portion 14c, the sealing ability at the portion is enhanced and the water inflow can be more reliably prevented.

Second Embodiment

A second embodiment will be described below on the basis of FIGS. 5A to 5D.

The water-inflow prevention device according to the second embodiment is provided with expansive blocking bodies 17 on both sides across a valve body 3 in a duct 2. The expansive blocking bodies 17 are attached on the top and bottom inner surfaces of the inner wall of the duct 2 one by one, i.e., four pieces of the expansive blocking bodies 17 in total are provided in the inside of the duct 2. Materials that expand due to absorbing water can be used as the expansive blocking bodies 17. Examples of the such materials include polyurethane, high water-absorption resin, and water expansion rubber.

Figure 5A:
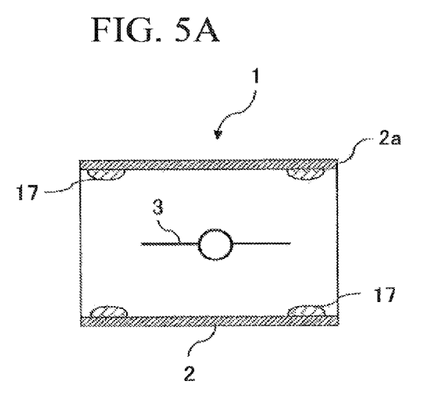
Figure 5B:
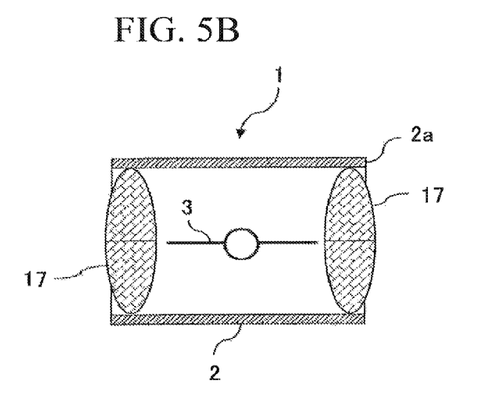
Figure 5C:
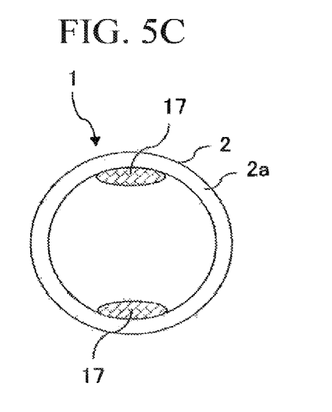

During flight of the aircraft 100, the four pieces of the expansive blocking bodies 17 are in a state of being shrunk as shown in FIG. 5A and FIG. 5C because the expansive blocking bodies 17 hardly contain water. Accordingly, the ventilation port 2a of the duct 2 is almost open. The air pressure inside the cabin 101 is therefore regulated in a manner that the opening degree of the valve body 3 in the duct 2 is regulated depending on the flight altitude of the aircraft 100.

Figure 5D:
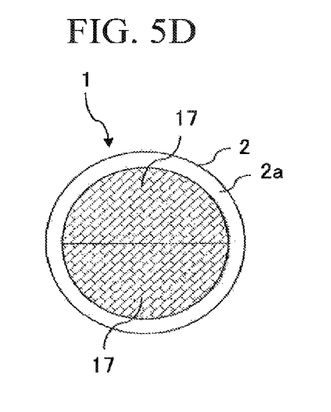

On the other hand, when the aircraft 100 lands on water and water flows into the duct 2, the expansive blocking bodies 17 expand due to absorbing the water and block the inside of the duct 2, so further water inflow can be prevented. In this embodiment, the expansive blocking bodies 17 are disposed on the both upstream and downstream sides of the valve body 3 in the direction of water inflow. Accordingly, even though water flows in before the expansive blocking bodies 17 on the upstream side fully expand, the expansive blocking bodies 17 on the downstream side are able to prevent the water to flow in further. It is therefore possible to prevent water inflow into the cabin 101 even though the operation of closing the valve body 3 by the pilot is postponed as with the first embodiment; consequently, safe escape of the passengers and crews can be secured.

Modification Example of Second Embodiment

Although an example of using a material that expands due to absorbing water as the expansive blocking bodies 17 is shown in the second embodiment described above, the present invention is not limited to this and it is possible to use another type of expansive blocking bodies 19, which expand due to being supplied with gas, instead of the expansive blocking bodies 17.

Figure 6A:
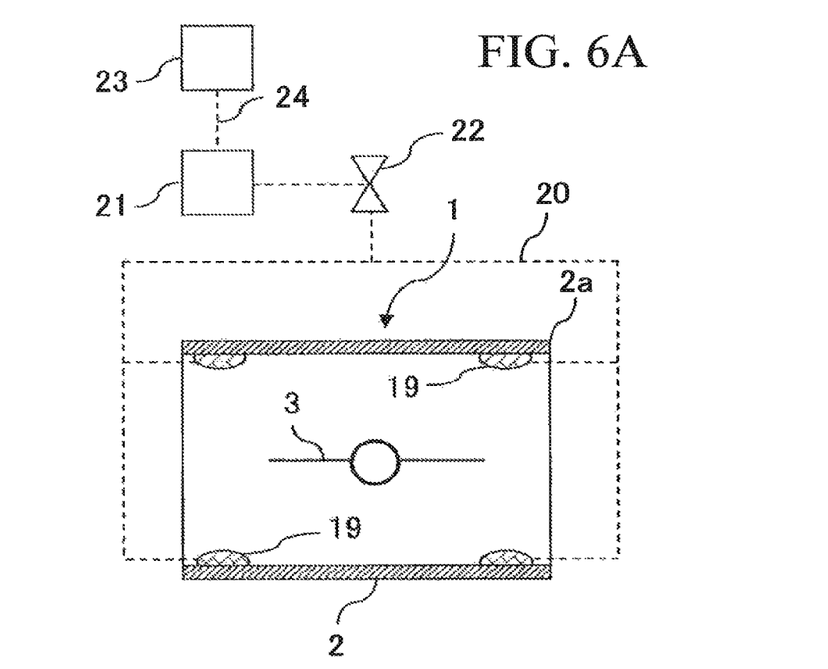
FIGS. 6A and 6B are drawings showing a modification example of the second embodiment.
Figure 6B:
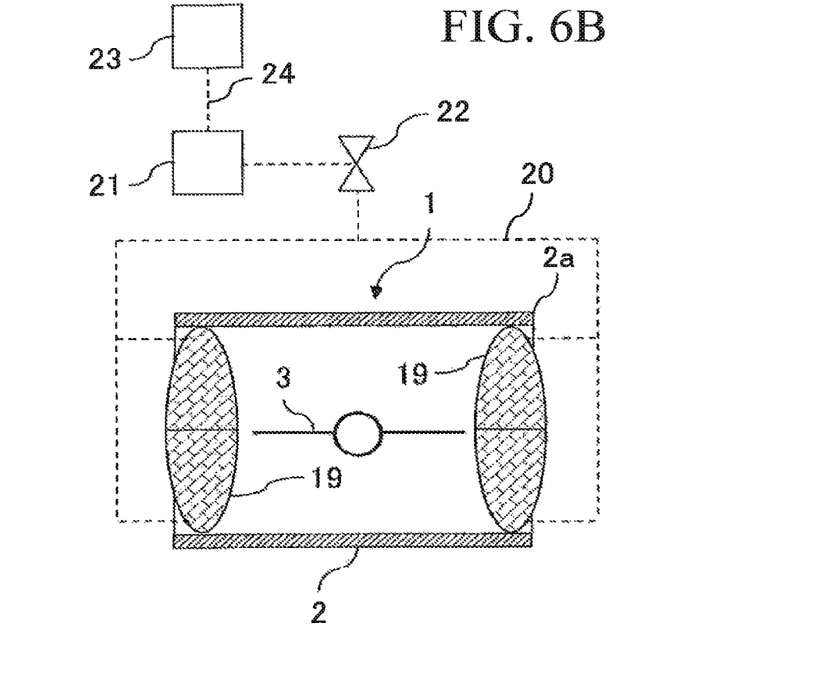

The expansive blocking bodies 19 are connected to a compressed air supply unit 21 through piping 20 as shown in FIGS. 6A and 6B. The compressed air supply unit 21 is equipped with a control valve 22 that controls whether or not to supply compressed air to the piping 20. To the compressed air supply unit 21, a shock detector 23 is connected through a signal line 24. When the shock detector 23 detects a specified shock which the aircraft 100 has undergone when, for example, landed on sea water and transmits it to the compressed air supply unit 21 through the signal line 24, the control valve 22 having closed until then opens and compressed air is supplied to the respective expansive blocking bodies 19 through the piping 20.

During flight of the aircraft 100, the four pieces of the expansive blocking bodies 19 are in a state of being shrunk as shown in FIG. 6A because the shock detector 23 does not detect any shock. Accordingly, the ventilation port 2a of the duct 2 is nearly open. The pilot can therefore regulate the air pressure inside the cabin 101 by controlling the opening degree of the valve body 3 in the duct 2 depending on the flight altitude of the aircraft 100.

On the other hand, when the aircraft 100 lands on water and the shock detector 23 detects a specified shock, the control valve 22 receives a shock detection signal through the signal line 24 and compressed air is supplied from the compressed air supply unit 21 to the expansive blocking bodies 19. The expansive blocking bodies 19 supplied with compressed air each expand like a balloon as shown in FIG. 6B to block the inside of the duct 2. It thereby becomes possible to prevent water to flow into the cabin 101 through the duct 2.

Incidentally, although a shock to the aircraft 100 may occur also when landing normally, it is possible to cancel transmission of the shock detected by the shock detector 23 to the compressed air supply unit 21 when, for example, wheels are pulled out in preparation for landing. Shocks to the aircraft 100 occurring when landing on water and when landing normally can thereby be distinguished and occurrence of a malfunction can be prevented.

Third Embodiment

A third embodiment will be described below on the basis of FIGS. 7A to 7D.

The third embodiment is such one in which a valve body 3 installed inside a duct 2 is closed by use of the force of flowing-in water.

Figure 7A:
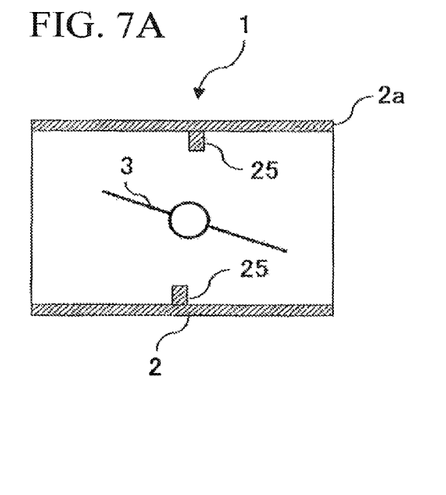
Figure 7B:
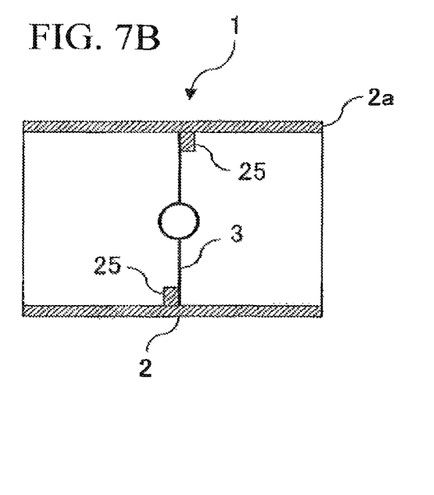
Figure 7C:
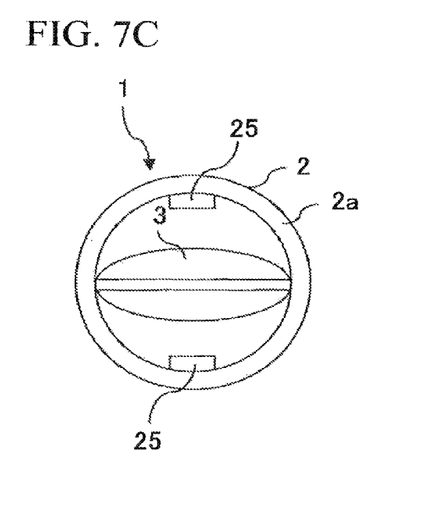
Figure 7D:
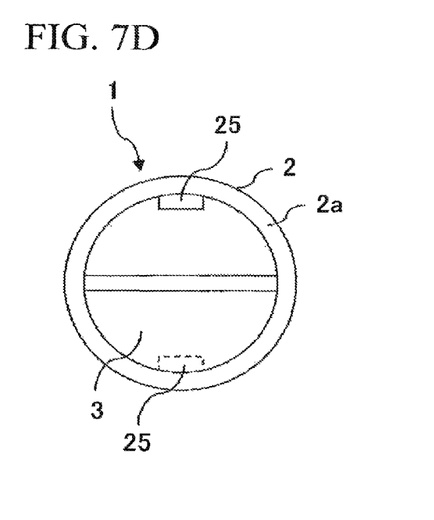

For that reason, the valve body 3 is inclined clockwise with respect to the horizontal direction in the third embodiment as shown in FIG. 7A. For the purpose of opening the duct 2 fully, the valve body 3 is normally suspended at a position along the horizontal direction, but the valve body 3 is intentionally rested at an inclined posture in this embodiment. In this case, since the water flowing into the duct reaches first the portion of the valve body 3 facing the outside of the aircraft, the valve body 3 rotates clockwise and shuts the duct 2 when rested at a position along the vertical direction as shown in FIG. 7B.

Although the degree of inclination of the valve body 3 is arbitrarily decided, it is desirable to incline the valve body 3 by several degrees from the horizontal level when taking it into consideration that the duct 2 is essentially fully opened.

In addition, since the valve body 3 may rotate clockwise further from the position along the vertical direction depending on the condition of flowing-in water, it is also desirable to install stoppers 25 for restricting the rotation at the top and bottom of the inner wall of the duct 2 in this embodiment. The pair of stoppers 25 are disposed symmetrically with respect to the valve shaft so that the valve body 3 is rested along the vertical direction. It is noted that only either one of upper and lower stoppers 25 may be allowed to be used.

During flight of the aircraft 100, the ventilation port 2a of the duct 2 is nearly open as shown in FIG. 7A. The air pressure inside the cabin 101 is therefore regulated in a manner that the opening degree of the valve body 3 in the duct 2 is regulated depending on the flight altitude of the aircraft 100.

On the other hand, when the aircraft 100 lands on water and water flows in from the outside of the aircraft, the flowing-in water reaches the valve body 3 and rotates it clockwise. When the valve body 3 is rotated to the position for shutting the duct 2, further rotation of the valve body 3 is restricted by the stoppers 25 installed at the top and bottom inside the duct 2. It is therefore possible to prevent water inflow into the cabin 101 even though the operation of closing the valve body 3 by the pilot is postponed; consequently, safe escape of the passengers and crews can be secured.

Fourth Embodiment

A fourth embodiment will be described below on the basis of FIGS. 8A to 8D.

Figure 8A:
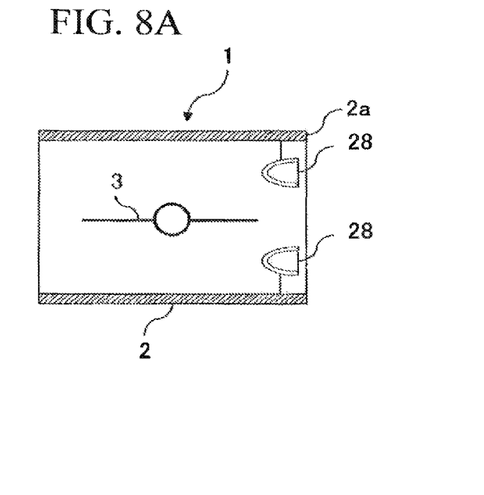
Figure 8B:
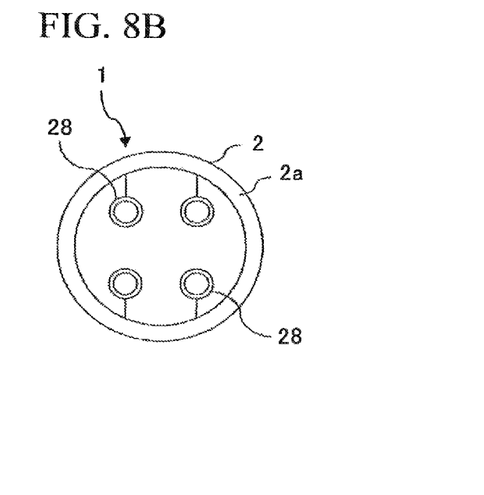

A water-inflow prevention device according to the fourth embodiment comprises resistance bodies 28 installed on the upstream side than a valve body 3 in the direction of water inflow inside a duct 2 as shown in FIG. 8A and FIG. 8B.

The resistance bodies 28 are disposed two by two in the up-and-down direction and the width direction of the duct 2; i.e., four pieces of the resistance bodies 28 in total are provided in the duct 2. The resistance bodies 28 each have a cup shape, and the resistance thereof against flowing-in water is made larger by arranging the opened side thereof to oppose to the direction of flowing-in water. Conversely, the resistance against the flow from the cabin 101 toward the outside of the aircraft is small because of the streamline shape of the resistance bodies 28.

During flight of the aircraft 100, the air pressure inside the cabin 101 can be regulated in a manner that the opening degree of the valve body 3 in the duct 2 is regulated depending on the flight altitude of the aircraft 100. At this time, since the resistance of the resistance bodies 28 against the exhaust from the cabin 101 toward the outside of the aircraft is small, smooth exhaust can be realized.

On the other hand, when the aircraft 100 lands on water and water flows into the duct 2, the water flowing in toward the resistance bodies 28 is temporarily held back and the amount of water flowing into the inside of the aircraft is reduced. Consequently, although allowing water inflow from the outside of the aircraft, since the amount of water flowing into the cabin 101 can be reduced or the water inflow can be delayed, safe escape of the passengers and crews can be secured even though the operation of closing the valve body 3 by the pilot is postponed.

Although installed on the upstream side in the duct 2 in the example shown in FIG. 8A and FIG. 8B, the resistance bodies 28 may be installed also on the downstream side in the duct 2.

Water inflow is lessened or delayed not only by the resistance bodies 28 each having a cup shape but also by the other resistance body, for example, as configured as follows.

Figure 8C:
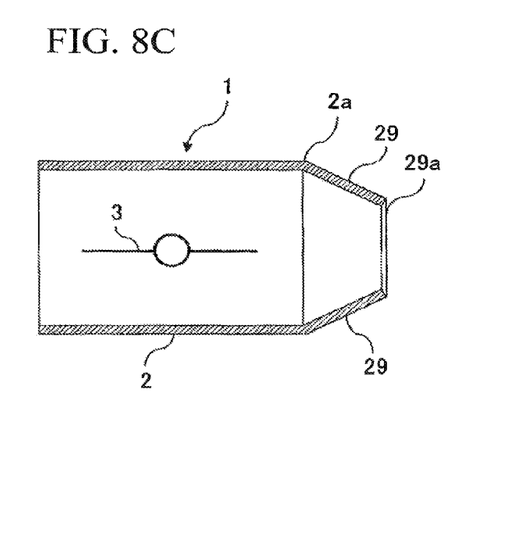
Figure 8D:
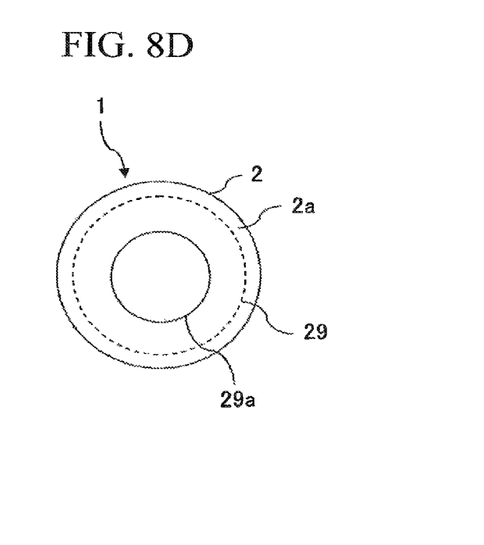

A conical-shaped resistance body 29 tapered down toward its tip is installed at one end of a duct 2 as shown in FIG. 8C and FIG. 8D. In the case when water flows in from the opening side of the resistance body 29, since the opening diameter of the opening 29a at the top end of the resistance body 29 is smaller than that of the ventilation port 2a of the duct 2, and also separation of flowing-in water occurs at the top end of the resistance body 29, the amount of flowing-in water reduces as compared to the case in which the resistance body 29 is not installed. That is, water inflow from the outside of the aircraft can be lessened or delayed by installing the resistance body 29. On the other hand, the resistance against a flow from the cabin 101 toward the outside of the aircraft is small, so smooth exhaust from the cabin 101 to the outside of the aircraft can be realized.

The amount of flowing-in water is dependent on the specification of the resistance body 29, and, for example, becomes smaller as the opening diameter of the opening 29a becomes smaller. Likewise, in the case in which the opening diameters are identical, the amount of flowing-in water can be reduced as the protrusion length from the top end of the ventilation port 2a to the opening 29a becomes longer. If the protrusion length is rendered to become longer too much, the weight becomes heavier and/or the installation space is required more, while the effect of water-inflow prevention hardly changes; accordingly, it is desirable to set the protrusion length in a range between 0.3 D to 1.0 D with respect to the diameter D of the ventilation port 2a.

The resistance body 29 can be formed integrally with the duct 2, but may be fabricated separately and installed to the duct 2 so as to be easily attached/detached.

Although an example in which the resistance body 29 is installed on the upstream side of the valve body 3 is herein presented, the resistance body 29 may be installed on the downstream side.

Moreover, although an example in which the resistance body 29 having a conical external shape is herein presented, a resistance body having such an arbitrary external shape as, for example, a triangular pyramid, a quadrangular pyramid, with which a similar effect as the conical shape can be obtained may be employed. In this case, it is allowed to displace the top end of the resistance body in a downward direction or an upward direction.

Fifth Embodiment

A fifth embodiment will be described below on the basis of FIGS. 9A to 9D.

Figure 9A:
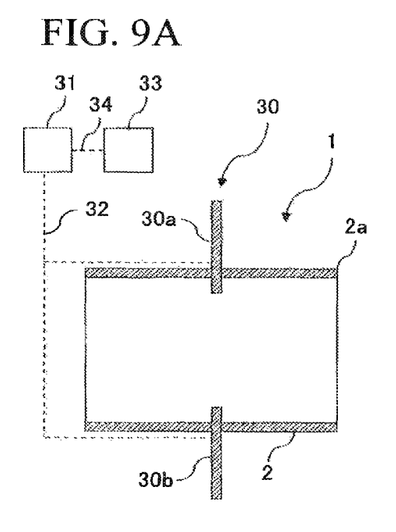
Figure 9B:
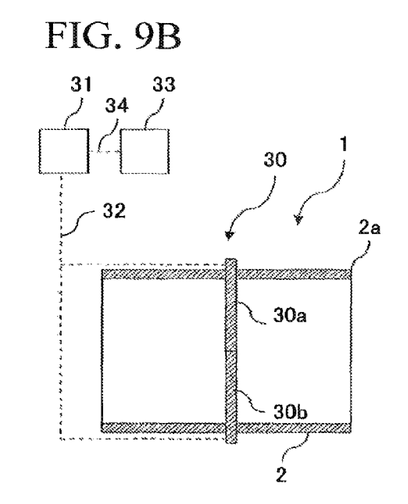

In the fifth embodiment, an air pressure regulating valve 1 is constructed of a valve body 30 using so-called a gate valve and a duct 2. This valve body 30 comprises a pair of shutter plates 30*a*, 30*b*, which are disposed at the top and bottom of the duct 2, respectively. The valve body 30 is rendered to be in an opened state, which causes the duct 2 to be opened as shown in FIG. 9A, when the shutter plates 30*a*, 30*b* receive electric power, while being rendered to be in a closed state, which causes the duct 2 to be shut as shown in FIG. 9B when the shutter plates 30*a*, 30*b* do not receive electric power. In the opened state, it is possible to control the degree of opening of the valve body 30 by adjusting the amount of advance/retraction of the shutter plates 30*a*, 30*b*.

The shutter plates 30*a*, 30*b* are equipped an actuator (not shown), by which advance/retraction motions of the shutter plates 30*a*, 30*b* are carried out. This actuator is connected to an electric power supply unit 31 for supplying electric power through an electric power cable 32, and the electric power supply unit 31 is connected to a shock detector 33 through a signal line 34.

The valve body 30 (shutter plates 30*a*, 30*b*) is forcibly rendered to be in an opened state by receiving electric power from the electric power supply unit 31 through the electric power cable 32. When the shock detector 33 detects a specified shock which the aircraft 100 has undergone when, for example, landed on sea water and transmits it to the electric power supply unit 31 through the signal line 34, the electric power supply unit 31 interrupts the electric power having been supplied until then, and the valve body 30 having been opened is thereby rendered to be in a closed state.

Figure 9C:
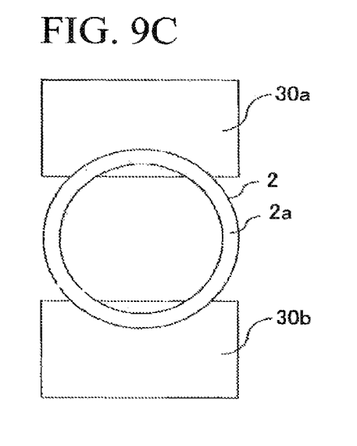

During flight of the aircraft 100, the valve body 30 is in an opened state as described above, the air pressure inside the cabin 101 is therefore regulated in a manner that the opening degree of the valve body 30 in the duct 2 is regulated depending on the flight altitude of the aircraft 100.

Figure 9D:
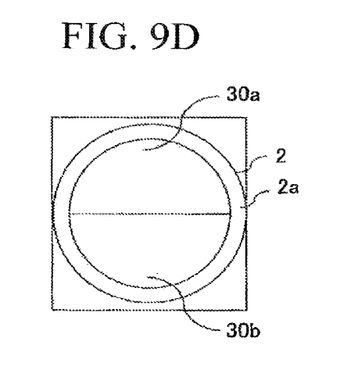

On the other hand, when the aircraft 100 lands on water and the shock detector 33 detects a specified shock, the electric power supply unit 31 receives a shock detection signal through the signal line 34 and electric power supply from the electric power supply unit 31 to the valve body 30 is broken, which causes the valve body 30 to be automatically closed. Consequently, the duct 2 is shut by the valve body 30 and water inflow from the outside of the aircraft can be prevented. It thereby becomes possible to prevent water inflow into the cabin 101 even though the operation of closing the valve body 30 by the pilot is postponed; consequently, safe escape of the passengers and crews can be secured. Although a shock to the aircraft 100 may occur also when landing normally, it is possible to prevent the occurrence of a malfunction through the method that is presented in the modification example of the second embodiment.

Although the valve body 30 is configured to be closed on the basis of the shock which the aircraft 100 has undergone when landed on water in this embodiment, it possible to close the valve body 30 not only due to that but also due to, for example, breaking electric power by a pilot, detecting stop of the engine of the aircraft 100, or detecting landing of the aircraft 100 on water through a water detection sensor.

Moreover, although the valve body 30 incorporating a gate valve is rendered to be a component of the air pressure regulating valve 1 in this embodiment, the valve body 30 incorporating the gate valve may be installed in addition to a butterfly valve that is used as an air pressure regulating valve as with the first embodiment.

Likewise, although an example of the pair of top and bottom shutter plates 30*a*, 30*b* is presented in this embodiment, the valve body may typically be constructed by employing either one of the top and bottom ones, or by use of an opening/closing mechanism having a plurality of blades combined with each other as used for an iris of a camera.

Although the present invention has been described above on the basis of the first to fifth embodiments thereof, the invention may be practiced by selectively adopting the configuration presented in the above embodiments or by modifying it appropriately into various other configurations not departing from the spirit and scope of the invention.

For example, the air pressure regulating valve 1 may be installed at an arbitrary position, and can be installed not limited in the lower portion of the body 102 but also in the upper portion thereof, which is effective in the occasion in which the aircraft 100 lands on water in an upside-down posture.

Moreover, the duct 2 of the air pressure regulating valve 1 is not limited to be cylindrically shaped but may be of a rectangular tube shape.

What is claimed is:

1. A water-inflow prevention device of an aircraft for preventing water inflow from an air pressure regulating valve in an occasion when the aircraft lands on water,
   the air pressure regulating valve being provided in the aircraft to regulate air pressure inside a cabin, and comprising a vent passage for connecting an inside and outside of the aircraft; and a valve body installed in an inside of the vent passage,
   wherein the air pressure regulating valve is rendered to be an obstacle with respect to the water inflow without being operated by a pilot of the aircraft, and
   wherein the obstacle moves when the aircraft lands on water, and blocks the vent passage.

2. The water-inflow prevention device according to claim 1, wherein the obstacle comprises a lid body that blocks the vent passage through a rotational motion or an upward motion by a buoyant force applied thereto.

3. The water-inflow prevention device according to claim 1, wherein the obstacle blocks the vent passage by expanding when absorbing water or when supplied with gas into its inside.

4. The water-inflow prevention device according to claim 1, wherein the obstacle comprises the valve body of the air pressure regulating valve that blocks the vent passage by moving when the aircraft lands on water.

* * * * *